May 7, 1957 R. N. JOHNSON ET AL 2,791,141

MAGNETIC CONTROL MEANS FOR PREDETERMINED TORQUE RELEASE WRENCH

Filed April 28, 1955

RICHARD JOHNSON &
ALLEN J. BRAME,
INVENTORS.

BY George J. Smyth
ATTORNEY.

United States Patent Office 2,791,141

Patented May 7, 1957

1

2

2,791,141

MAGNETIC CONTROL MEANS FOR PREDETERMINED TORQUE RELEASE WRENCH

Richard N. Johnson and Allen J. Brame, Los Angeles, Calif., assignors, by mesne assignments, to The Plomb Tool Company, Los Angeles, Calif., a corporation Application April 28, 1955, Serial No. 504,570

10 Claims. (Cl. 81—52.4)

This invention relates to a tool for applying torque of predetermined magnitude to screw-threaded devices such as screws, bolts and nuts and is directed specifically to the construction of a wrench for measuring and/or limiting the applied torque.

One of the problems to which the invention is directed is the minimizing of error with respect to torque measurement and a second and closely related problem is to provide a torque-limiting wrench in which any minimum residual error in torque measurement is uniformly distributed over the whole torque range of the tool. These two problems have not been met with complete satisfaction by torque measuring and torque-limiting hand wrenches heretofore available.

In general, prior art wrenches for the controlled application of torque to screw-threaded devices have been of either what may be termed the deflection type or of what may be termed the spring-loaded cam type. The deflection type utilizes the flexure of a beam member for measuring torque and typically has a pointer that moves along a radial scale in accord with the magnitude of the manual force applied to the wrench. Error arises because it is difficult to control the application of the manual force in a manner to bring the pointer precisely to a desired point on the scale and especially when the user's arm tires. The actual applied torque is either over or under the desired magnitude.

The spring-loaded cam type has a cam under spring pressure that operates with a snap action when a desired torque magnitude is reached. There is an advantage in the snap action since it occurs at some definite torque magnitude that may be repeated accurately but error with respect to the evaluation of that magnitude arises from two sources. One source of error arises from the friction resistance to movement of the cam and a second source of error arises from variation in the resistance of the spring at various loadings.

The present invention completely eliminates flexure of the working parts as a factor in the determination of torque. This advantage is gained by applying the torque force at one end of a lever or series of levers and applying magnetic force at the other end of the lever or series of levers to oppose the applied torque. The magnetic force may be provided by a suitable permanent magnet in cooperation with an armature that is movable into and out of contact with the pole of the magnet. Since the force of the magnetic field acting on the armature drops abruptly as the armature separates from the pole of the magnet, the separation occurs with a snap action and at a definite critical "break-away" magnitude of the applied force.

Since the break-away force is constant, the magnitude of the applied torque at which the lever system will yield by separation of the armature from the magnet will depend upon the relative lengths of the lever arms. Thus at the critical torque magnitude a relatively flexible lever will bend or bow to greater degree than a relatively rigid arm but will, nevertheless, provide just as accurate determination of the critical magnitude. Any number of levers may be included in a lever system for this purpose without accumulated flexure of the levers causing error.

The permanent magnet may be immobilized with the armature carried by an adjacent lever or the armature may be immobilized with the permanent magnet carried by the lever. In the preferred practice of the invention, the permanent magnet is fixed.

Preferably, the range of movement of the armature relative to the permanent magnet is limited to keep the armature in the field of force of the permanent magnet at all times. With the armature continuously magnetically linked with the permanent magnet, the effectiveness of the magnet is maintained substantially constant over a long period of time. A feature of the preferred practice of the invention is the concept of using a resilient stop for this purpose, the stop being in the path of movement of the lever and providing a desirable cushioning effect.

In the preferred practice of the invention, a lever system is mounted inside an elongated wrench body or casing with the levers arranged generally longitudinally thereof. A torque-applying member such as a socket member is rotatably mounted on one end of the wrench body for releasable engagement with a screw-threaded device such as a screw or nut and the lever system is operatively connected with this torque-applying member to respond to rotation of the wrench body relative to the member. Responsive rotation of the wrench body relative to the torque-applying member is, of course, opposed by the permanent magnet in cooperation with the associated armature. Thus when the user employs the wrench to tighten a screw-threaded device and progressively increases the magnitude of manual force applied to the wrench, a point is reached at which the wrench body suddenly yields to the applied force, the yielding action being caused by the sudden separation of the armature from the magnet. Thus, the wrench automatically terminates the torque rise at the desired magnitude and at the same time automatically signals the attainment of the desired magnitude.

While the invention may be embodied in a torque-limiting wrench of the described construction that yields at a fixed magnitude of applied torque, it is apparent that such a wrench may be made adjustable with respect to the limit torque by including provision for varying the relative lengths of the lever arms. In this regard, a feature of the preferred practice of the invention is the concept shifting the fulcrum point of a lever by using a fulcrum member for the lever that is slidable longitudinally thereof. An important advantage of such an arrangement is that a pointer or index means may be operatively connected to such a fulcrum member for movement along a suitable scale for guidance in setting the torque limit.

A further feature of the preferred practice of the invention is the concept of using two cooperating scales for adjusting the magnitude of the limit torque with precision. For this purpose, screw means is rotatable to shift the fulcrum member thereby to vary the relative lengths of the lever arms. A first coursely graduated scale has an index means responsive to the longitudinal movement of the fulcrum member and a second finely graduated scale has an index means responsive to rotation of the screw means. A further feature of the invention in this regard is the concept of varying the pitch of the screw means exponentially, the first courser scale being an exponential scale, and the second finer scale being a linear scale.

The various features and advantages of the invention will be apparent from the following detailed description taken with the accompanying drawing.

In the drawing, which is to be regarded as merely illustrative:

Figures 1, 2, 3, 4, 5, 6, 7, 8, 9:
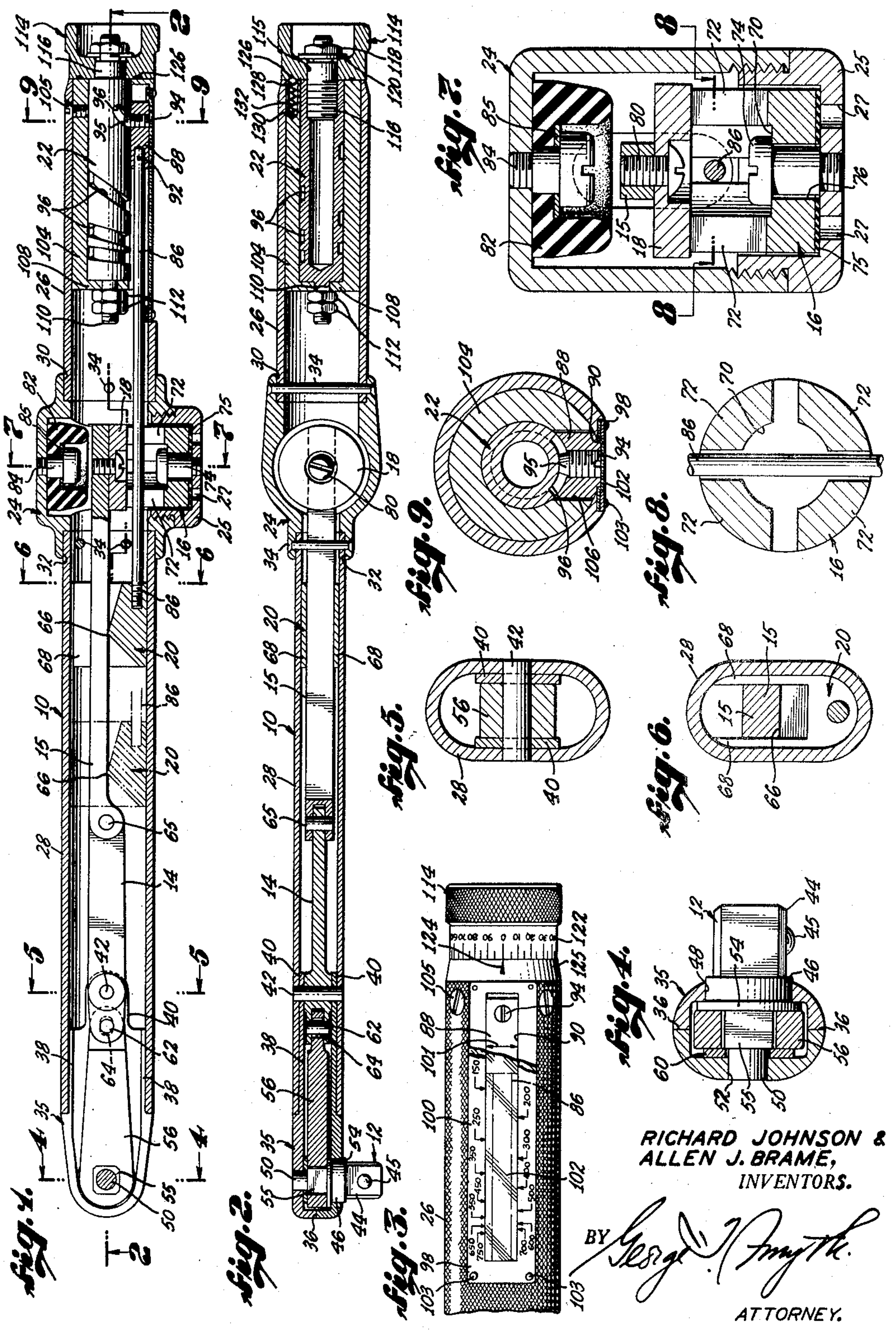
Figure 1 is a longitudinal sectional view of the presently preferred embodiment of the invention.
Figure 2 is a similar sectional view taken at 90° from the first view as indicated by the broken line 2—2 of Figure 1.
Figure 3 is a slightly enlarged side elevation of the handle portion of the tool.
Figure 4 is a transverse section taken as indicated by the line 4—4 of Figure 1 showing the torque-applying member that is rotatably mounted on the wrench body.
Figure 5 is a transverse section taken as indicated by the line 5—5 of Figure 1 showing a cross pin that not only unites portions of the wrench body but also serves as a fulcrum point for a lever.
Figure 6 is a transverse section taken as indicated by the line 6—6 of Figure 1 showing how a shiftable fulcrum member slidingly engages a corresponding lever.
Figure 7 is an enlarged transverse section taken as indicated by the line 7—7 of Figure 1 showing the permanent magnet and the associated armature mounted on an adjacent lever.
Figure 8 is a fragmentary section taken as indicated by the line 8—8 of Figure 7 showing the four pole pieces of the permanent magnet in cross section.
Figure 9 is a section taken as indicated by the line 9—9 of Figure 1 showing a portion of the rotary screw means for shifting the fulcrum member.

The principal working parts of the selected embodiment of the invention shown in the drawing are enclosed in a body or casing generally designated by numeral 10. These principal parts include: a torque-applying member 12 that is rotatably mounted in thes casing; a lever system including a first lever 14 and a second lever 15, which lever system is operatively connected with the torque-applying member 12 for response thereto; a permanent magnet, generally designated by numeral 16, that is fixedly carried by the casing; an armature 18 carried by the second lever 15 to oppose relative rotation between the torque-applying member 12 and the casing 10; a fulcrum member 20 that fulcrums the second lever 15; and means including an adjustable screw member 22 to vary the position of the fulcrum member 20 relative to the second lever.

The casing 10 is of elongated configuration and includes a central casing structure 24 made of non-magnetic material, such as a suitable grade of stainless steel, to house the permanent magnet 16 and the armature 18. This central casing structure 24 has a removable screw-threaded closure member 25 that is of cup-shaped configuration to seat one end of the permanent magnet 16. Preferably the closure member 25 has apertures 27 for engagement by a spanner in a well known manner.

Extending in one longitudinal direction from the central casing structure 24 is a tubular casing section 26 which is knurled as shown in Figure 3 to form a handle for the device. Extending in the other longitudinal direction from the central casing structure 24 is a second tubular section 28 which is of flattened or oval cross-sectional configuration. These two casing sections 26 and 28 seat into corresponding openings 30 and 32 in the central casing structure and are permanently secured by flush rivets 34. The tubular casing sections 26 and 28 preferably are additionally bonded to the central casing structure 24 by furnace brazing.

The flattened tubuar section 28 has a removable hollow nose 35 in which the torque-applying member 12 is rotatably mounted. In the construction shown, the nose member 35 is made in two halves as indicated by the dividing line 36 in Figure 2. The nose member 35 has a portion 38 of reduced cross-sectional dimension that telescopes into the tubular section 28 with a snug sliding fit. This reduced portion 38 has extended ears 40 and these ears as well as the adjacent walls of the tubular casing section 28 are apertured to receive a cross pin 42. The cross pin holds the nose member in position on the tubular casing section and may be removed to free the nose member when desired.

The torque-applying member 12 has a square head 44 to releasably fit into a conventional socket member (not shown), there being a set of such socket members for interchangeable use on the torque-applying member in a well known manner. For this purpose, the square head 44 of the torque-applying member may have the usual spring pressed ball detent 45 for releasably engaging the socket members.

As best shown in Figure 4, the torque-applying member 12 may have a circular portion 46 to journal in a circular aperture 48 in one wall of the nose member 35 and may have a similar portion 50 of circular cross-sectional configuration to journal in a second circular aperture 52 in the other wall of the nose member. The torque-applying member 12 is formed with a radial flange 54 and also with an intermediate portion 55 of square cross-sectional configuration. The square portion 55 serves as means to connect the torque-applying member to a radial arm 56, the square portion extending through a corresponding square aperture in the arm. Preferably a suitable washer 60 is mounted on the torque-applying member 12 to cooperate with the radial flange 54 for holding the radial arm 56 spaced from the two opposite walls of the nose member, thereby to insure full freedom for rotation of the radial arm.

The previously mentioned first lever 14 is pivotally mounted on the previously mentioned cross pin 42, this lever having a relatively short arm operatively connected to the radial arm 56 and having a relatively long arm that is operatively connected to the second lever 15. In the construction shown, the first lever 14 is forked to receive the end of the radial arm 56 and carries a connecting pin 62 that extends through a slot 64 in the radial arm. It is apparent that rotation of the torque-applying member 12 relative to the tool casing will cause the radial arm 56 to actuate the first lever 14. The second lever 15 is forked to receive the end of the first lever 14 and is connected thereto by a pin 65. This second lever 15 rests against the fulcrum member 20 as shown in Figure 1.

The fulcrum member 20 is beveled in opposite directions to provide a transverse linear edge 66 in contact with the second lever 15, this linear edge being the fulcrum point of the lever. As best shown in Figure 6, the fulcrum member 20 conforms to the cross-sectional configuration of the flattened tubular casing section 28 for sliding seat therein and is formed with two spaced flanges 68 that extend on opposite sides of the second lever 15.

The permanent magnet 16 may be a body of circular cross-sectional configuration which, as best shown in Figure 8, has an axial bore 70 and has diametrical cuts that divide one end of the magnet into four poles 72, there being two diametrical pairs of north and south poles. The permanent magnet 16 is anchored to the cup-shaped closure member 25 by a central screw 74 that holds the permanent magnet seated against a suitable washer 75 of rubber-like material. The yieldable washer 75 is smaller in diameter than the surrounding casing wall to provide clearance for radial expansion of the washer under pressure. The central screw 74 extends through a central aperture 76 (Figure 7) of the permanent magnet that is oversize with respect to the screw and the permanent magnet is undersize with respect to the surrounding wall of the cup-shaped closure 25.

This arrangement in which the permanent magnet 16 is backed against the yielding washer 75 permits the permanent magnet a certain limited freedom to rock into intimate face-to-face relationship with the armature 18. This floating mount for the permanent magnet makes it unnecessary to shape and dimension the parts with close accuracy to obtain the desired intimate face-to-face contact between the magnet and armature.

The armature 18 is made of suitable material such as soft iron and is anchored to the second lever 15 by a suitable screw 80. To limit the movement of the armature away from the permanent magnet suitable stop means may be provided, preferably in the form of a yielding cushion. For this purpose, a circular cushion member 82 of suitable rubber-like material is anchored in place by a central screw 84 and a washer 85. By virtue of this arrangement, the armature 18 at its position of maximum distance from the permanent magnet 16 is still within the field of force of the magnet, being linked with a substantial portion of the lines of force of the magnetic field.

The fulcrum member 20 may be connected by an operating rod 86 with a carriage 88 that is moved by rotation of the previously mentioned screw member 22. The carriage 88 may be in the form of a metal block that rides along a slot 90 in the tubular casing section 26. The operating rod 86 which is made of non-magnetic material such as brass may have one end threaded into the fulcrum member 20, as shown in Figure 1, and may have the other end anchored in a bore in the carriage block 88 by means of a small cross pin 92.

A suitable screw 94 threaded into the carriage block 88 has a tapered nose 95 extending into a groove 96 in the periphery of the previously mentioned adjustable screw member 22. The groove 96, which is equivalent to a screw thread, is of helical configuration and varies progressively in pitch in an exponential manner. Thus the carriage block 88 is the equivalent of a traveling nut governed by a non-uniformly threaded adjustable screw.

As best shown in Figure 3, the handle portion of the tool casing has a flat thin plate 98 lying on both sides of the casing slot 90 and this flat plate is marked with a scale 100. This particular embodiment of the invention is designed for a torque range of 100 to 750 inch-pounds and each gradation of the scale 100 represents 50 inch-pounds. The carriage block 88 carries a suitable index mark 101 to indicate values on this scale. Preferably a sheet of transparent plastic material 102 covers the casing slot 90 to serve as a window, the plastic sheet together with the thin flat plate 98 being held in place by suitable fastening elements 103.

The adjustable screw member 22 is journalled in a cylindrical block 104 (Figure 9) that fits snugly into the handle portion of the casing and is secured by suitable screws 105. The cylindrical block 104 is cut away longitudinally to provide a guide slot 106 for the carriage block 88 and has an end wall 108 which journals a reduced end portion 110 of the adjustable screw member 22. A pair of nuts 112 are jammed together on this reduced end portion to prevent axial retraction of the adjustable screw member.

Preferably the adjustable screw member 22 is manually controlled by a knurled rotary knob 114. In the construction shown the rotary knob 114 has an axial aperture 115 by means of which it is rotatably mounted on a stud 116 in the end of the adjustable screw member 22. The stud 116 carries a nut 118 that may be tightened against a washer 120 to immobilize the rotary knob relative to the adjustable screw member. It is apparent that the nut 118 may be loosened for rotational adjustment of the rotary knob.

The rotary knob 114 has a circumferential scale 122, each gradation of which represents 5 inch-pounds of torque. A suitable index mark 124 on an adjacent beveled end surface 125 of the handle portion of the casing indicates values on the circumferential scale 122.

Preferably a suitable detent means is provided to retain the rotary knob 114 in a yielding manner at a plurality of rotary positions corresponding to registration of the various marks on the scale 122 with the index mark 124. For this purpose, the inner planar face of the rotary knob 114 may be formed with a circumferential series of shallow spherically-curved recesses 126 for yielding engagement by a small detent ball 128. The detent ball is housed in a small bore 130 in the cylindrical block 104 and is pressed towards the rotary knob 114 by a suitable spring 132.

The manner in which the described wrench operates for its purpose may be readily understood from the foregoing description. To set or adjust the tool for a selected torque limit, the knob 114 is manually rotated to plate the index 101 on the carriage block 88 at the desired 50 inch-pound range of the first scale 100 and then is adjusted to position the second circumferential scale 122 relative to the fixed index mark 124 in accord with the particular 5 inch-pound value desired in the selected range.

The operator then applies the wrench in the usual manner to tighten a screw-threaded device such as a nut by means of the torque-applying member 12. As the screw-threaded device tightens the operator applies progressively greater force to the handle of the tool until the magnetic attraction between the magnet 16 and the armature 18 is overcome. At this point, the second lever 15 snaps away from the permanent magnet to the cushion member 82. In effect, the tool body 10 suddenly yields relative to the torque-applying member 12. This yielding snap action is relatively slight in terms of relative angular movement but nevertheless, is definite and unmistakable to give the operator a clear signal that the desired torque limit has been reached. As soon as the operator releases his grip the magnet immediately attracts the armature to its normal position thereby automatically resetting the wrench for the next torque-applying operation.

Although the now preferred embodiments of the present invention have been shown and described herein, it is to be understood that the invention is not to be limited thereto, for it is susceptible to changes in form and detail within the scope of the appended claims.

We claim:

1. In a torque-indicating wrench to tighten a screw-threaded device, the combination of: a wrench body; a torque-applying member rotatably mounted on said body and adapted for releasable engagement with said screw-threaded device; a lever carried by said body and operatively connected with said member to respond to rotation of the body relative to the member; and means to apply magnetic force of predetermined magnitude to hold said lever in a normal position relative to said body thereby to provide a predetermined torque-resistance to rotation of said body relative to said member, whereby said lever rotates out of said normal position and permits said body to yield rotatably relative to said member when said torque-resistance is overcome by force applied to said body.

2. A combination as set forth in claim 1 which includes means to vary the relative lengths of the two arms of said lever thereby to vary the magnitude of said predetermined torque-resistance.

3. A combination as set forth in claim 1 which includes a second lever operatively connecting said first mentioned lever with said torque-applying member to provide a high total leverage ratio.

4. In a torque-indicating wrench to tighten a screw-threaded device, the combination of: a wrench body; a torque-applying member rotatably mounted on said body and adapted for releasable engagement with said screw-threaded device; a lever carried by said body and operatively connected with said member to respond to rotation of the body relative to the member; a permanent magnet element; and an armature element normally in magnetically-held contact with said magnet, thereby to provide a predetermined torque-resistance to rotation of said body relative to said member, whereby said lever rotates out of said normal position and permits said body to yield rotatably relative to said member when said torque-resistance is overcome by force applied to said body, one of said elements being fixedly mounted on said body, the other of said elements being mounted on said lever.

5. A combination as set forth in claim 4 in which one of said elements is mounted for limited rocking movement to rock into intimate face-to-face contact with the other element.

6. A combination as set forth in claim 4 which includes means to limit rotation of said lever to keep said armature element sufficiently within the field of force of said permanent magnet element when said torque resistance is exceeded that the lever is returned to said normal position by the magnetic attraction between said elements when the force is removed from said body.

7. In a torque-indicating wrench to tighten a screw-threaded device, the combination of: a wrench body; a torque-applying member rotatably mounted on said body and adapted for releasable engagement with said screw-threaded device; a lever carried by said body and operatively connected with said member to respond to rotation of the body relative to the member; means to apply magnetic force of predetermined magnitude to hold said lever in a normal position relative to said body thereby to provide a predetermined torque-resistance to rotation of said body relative to said member whereby said lever rotates out of said normal position and permits said body to rotate relative to said member when said torque-resistance is overcome by force applied to said body; and means to shift the fulcrum point of said lever thereby to vary the magnitude of said predetermined torque-resistance.

8. A combination as set forth in claim 7 which includes: an adjustable fulcrum member on which said lever is fulcrumed; rotary screw-threaded means operatively connected with said fulcrum member for shifting the fulcrum point of the lever, the axis of rotation of said screw-threaded member extending in the same general direction as the path of adjustment movement of the fulcrum member; a scale of relatively large units of torque-resistance; means responsive to movement of said fulcrum member to indicate values on said scale; a second scale of relatively small units of torque-resistance; and means responsive to rotation of said screw-threaded means to indicate values of said second scale.

9. A combination as set forth in claim 8 in which said first scale is an exponential scale, said second scale is a linear scale, and the pitch of the screw threads of said screw-threaded means varies exponentially.

10. In a torque-indicating wrench to tighten a screw-threaded device, the combination of: an elongated hollow wrench body having a handle portion at one end; a torque-applying member rotatably mounted on the other end of said body and adapted for releasable engagement with said screw-threaded device; a lever inside said body and extending generally longitudinally thereof, said lever being operatively connected with said member to respond to rotation of the wrench body relative to said member; a permanent magnet carried by said body to apply magnetic force of predetermined magnitude to hold said lever in a normal position thereby to provide a predetermined torque-resistance to rotation of said body relative to said member; a fulcrum member to serve as a fulcrum for said lever, said fulcrum member being mounted on said body for movement longitudinally thereof to vary the magnitude of said predetermined torque-resistance; means in a region of the handle portion of said body for shifting said fulcrum member longitudinally of the body; and means responsive to said shifting means to indicate the magnitude of said torque-resistance.

References Cited in the file of this patent

UNITED STATES PATENTS

| | | |
|---|---|---|
| 1,519,800 | Rifflard | Dec. 16, 1924 |
| 2,205,501 | Sunnen | June 25, 1940 |
| 2,250,941 | Zimmerman | July 29, 1941 |
| 2,663,209 | Gummere et al. | Dec. 22, 1953 |

FOREIGN PATENTS

| | | |
|---|---|---|
| 1,056,588 | France | Oct. 21, 1953 |